(12) United States Patent
Yamada et al.

(10) Patent No.: US 12,594,940 B2
(45) Date of Patent: Apr. 7, 2026

(54) INFORMATION PROCESSING DEVICE, INFORMATION PROCESSING METHOD, AND NON-TRANSITORY COMPUTER READING STORAGE MEDIUM PROVIDING NOTIFICATION WHEN USER INSTRUCTION FOR IN-VEHICLE DEVICE INDICATES A PREDETERMINED LEVEL OF RISK

(71) Applicant: TOYOTA JIDOSHA KABUSHIKI KAISHA, Toyota (JP)

(72) Inventors: Kaori Yamada, Nagakute (JP); Keiko Nakano, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 18/544,593

(22) Filed: Dec. 19, 2023

(65) Prior Publication Data

US 2024/0208508 A1 Jun. 27, 2024

(30) Foreign Application Priority Data

Dec. 22, 2022 (JP) ................................. 2022-205891

(51) Int. Cl.
| | |
|---|---|
| *B60W 30/182* | (2020.01) |
| *B60W 40/08* | (2012.01) |
| *B60W 50/08* | (2020.01) |
| *B60W 50/14* | (2020.01) |
| *B60W 60/00* | (2020.01) |

(52) U.S. Cl.
CPC .......... *B60W 30/182* (2013.01); *B60W 40/08* (2013.01); *B60W 50/082* (2013.01); *B60W 50/14* (2013.01); *B60W 60/0051* (2020.02); *B60W 60/0059* (2020.02); *B60W 2040/089* (2013.01); *B60W 2540/21* (2020.02); *B60W 2556/10* (2020.02)

(58) Field of Classification Search
None
See application file for complete search history.

(56) References Cited

U.S. PATENT DOCUMENTS

| | | | | |
|---|---|---|---|---|
| 10,241,509 B1* | 3/2019 | Fields | ................ | A61B 5/02028 |
| 2017/0072850 A1* | 3/2017 | Curtis | ................... | B60K 35/85 |

(Continued)

FOREIGN PATENT DOCUMENTS

| | | |
|---|---|---|
| JP | 2021-148971 A | 9/2021 |
| JP | 2022-063121 A | 4/2022 |
| WO | 2020/017166 A1 | 1/2020 |

*Primary Examiner* — James J Lee
*Assistant Examiner* — Andrew Sang Kim
(74) *Attorney, Agent, or Firm* — Sughrue Mion, PLLC

(57) ABSTRACT

An information processing device includes a control unit. The control unit is configured to acquire a speech of a user to instruct a predetermined device to execute a predetermined function, acquire a level of a risk expected to occur when the predetermined device executes the predetermined function, output a notification confirming with the user whether to permit the predetermined device to execute the predetermined function when the level of the risk is equal to or higher than a predetermined level, and cause the predetermined device to execute the predetermined function when the user permits the predetermined device to execute the predetermined function.

12 Claims, 7 Drawing Sheets

(56) References Cited

U.S. PATENT DOCUMENTS

| | | | |
|---|---|---|---|
| 2017/0247040 A1* | 8/2017 | Miller | ................. G05D 1/0248 |
| 2021/0134272 A1 | 5/2021 | Saito | |
| 2021/0139036 A1* | 5/2021 | Kim | ....................... G10L 15/22 |
| 2022/0111855 A1 | 4/2022 | Maeda et al. | |
| 2023/0192114 A1* | 6/2023 | Kunberger | ...... B60W 30/18163 |
| | | | 701/24 |

* cited by examiner

Figure 2:
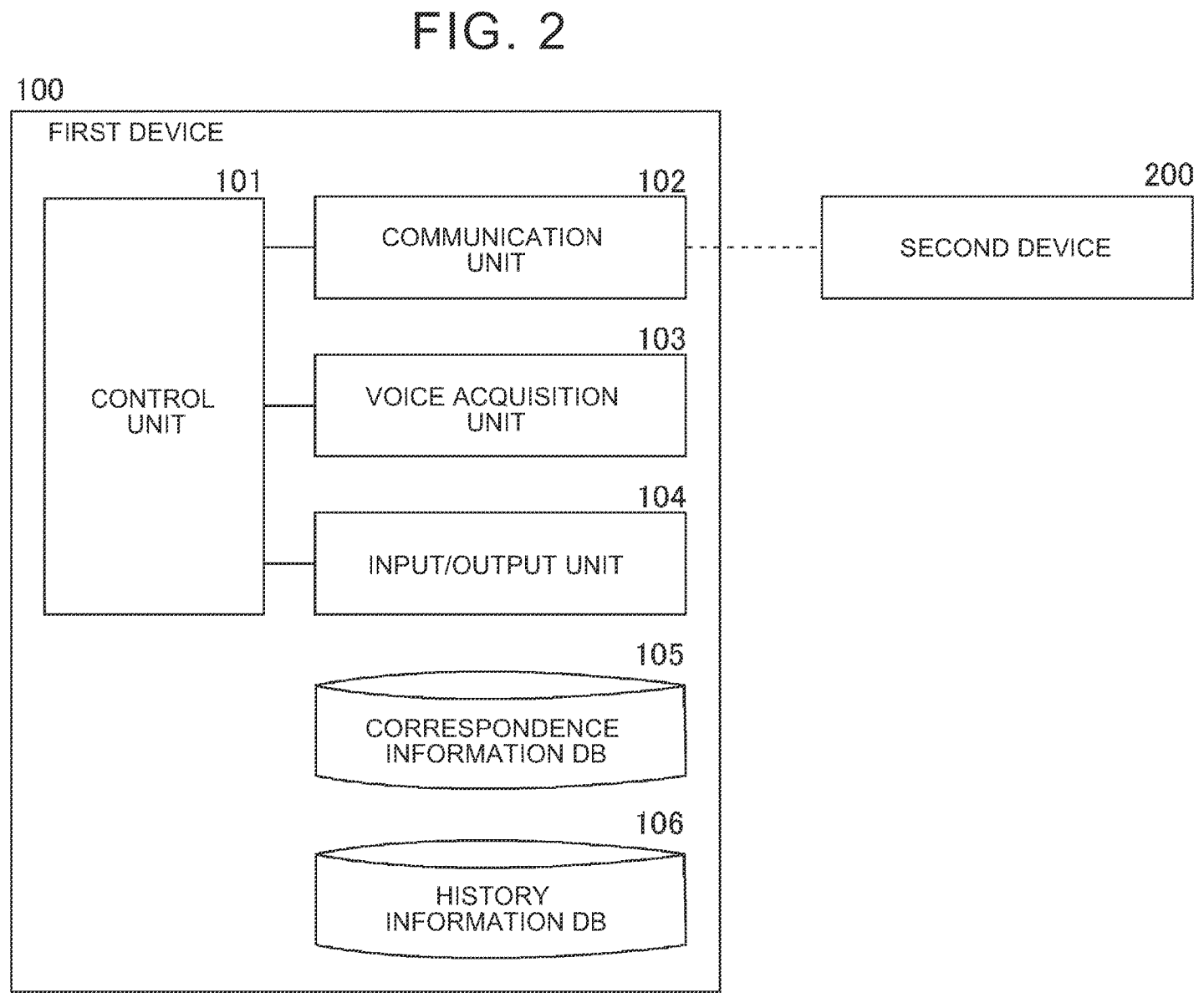

SECOND DEVICE

100

FIRST DEVICE

101

CONTROL UNIT

102

COMMUNICATION UNIT

103

VOICE ACQUISITION UNIT

104

INPUT/OUTPUT UNIT

105

CORRESPONDENCE INFORMATION DB

106

HISTORY INFORMATION DB

FIG. 3

CORRESPONDENCE INFORMATION

| INSTRUCTION | DEVICE | FUNCTION | ROAD CATEGORY | RISK LEVEL |
|---|---|---|---|---|
| *** | *** | *** | *** | *** |
| ... | ... | ... | ... | ... |

FIG. 4

HISTORY INFORMATION

| DATE/TIME | ROAD CATEGORY | DEVICE | FUNCTION |
|-----------|---------------|--------|----------|
| *** | *** | *** | *** |
| ... | ... | ... | ... |

FIG. 7

CORRESPONDENCE INFORMATION

| INSTRUCTION | DEVICE | FUNCTION | EXECUTION STATUS OF FUNCTION BY DEVICE | RISK LEVEL |
|---|---|---|---|---|
| *** | *** | *** | *** | *** |
| ・・・ | ・・・ | ・・・ | ・・・ | ・・・ |

1

INFORMATION PROCESSING DEVICE, INFORMATION PROCESSING METHOD, AND NON-TRANSITORY COMPUTER READING STORAGE MEDIUM PROVIDING NOTIFICATION WHEN USER INSTRUCTION FOR IN-VEHICLE DEVICE INDICATES A PREDETERMINED LEVEL OF RISK

CROSS-REFERENCE TO RELATED APPLICATION

This application claims priority to Japanese Patent Application No. 2022-205891 filed on Dec. 22, 2022, incorporated herein by reference in its entirety.

BACKGROUND

1. Technical Field

The present disclosure relates to an information processing device, an information processing method, and a non-transitory computer-readable storage medium.

2. Description of Related Art

Japanese Unexamined Patent Application Publication No. 2021-148971 (JP 2021-148971 A) discloses a voice recognition method using a voice recognition device that receives a control request for a device mounted on a mobile object based on a user's voice instruction. In the voice recognition method disclosed in JP 2021-148971 A, the voice recognition device acquires voice, converts the acquired voice into voice data, and acquires state information of the mobile object. In the voice recognition method, the voice recognition device estimates a voice collection environment in which the voice is acquired based on the state information of the mobile object. In the voice recognition method, the voice recognition device sets a detection mode for identifying the control request associated with the voice data based on the voice collection environment. In the voice recognition method, the voice recognition device analyzes the voice data based on the set detection mode, and identifies an operation target device to be controlled and the control request for the operation target device.

SUMMARY

In the present disclosure, a predetermined device can safely execute a predetermined function.

An information processing device according to a first aspect of the present disclosure includes a control unit. The control unit is a processor configured to acquire a speech of a user to instruct a predetermined device to execute a predetermined function, acquire a level of a risk expected to occur when the predetermined device executes the predetermined function, output a notification confirming with the user whether to permit the predetermined device to execute the predetermined function when the level of the risk is equal to or higher than a predetermined level, and cause the predetermined device to execute the predetermined function when the user permits the predetermined device to execute the predetermined function.

In the information processing device according to the above aspect, the user may be an occupant of a vehicle, and the predetermined device may be an in-vehicle device mounted on the vehicle.

2

In the information processing device according to the above aspect, the control unit may further be configured to acquire first information including information on a traveling condition of the vehicle when the user makes the speech, and determine whether the level of the risk is equal to or higher than the predetermined level based on the traveling condition of the vehicle that is indicated by the first information.

In the information processing device according to the above aspect, the control unit may be configured to acquire first information including information on a traveling condition of the vehicle when the user makes the speech, acquire second information including information on a traveling condition of the vehicle when the user permitted the predetermined device to execute the predetermined function in a past, and cause the predetermined device to execute the predetermined function without outputting the notification in a case where the traveling condition indicated by the first information for the vehicle when the user makes the speech agrees with the traveling condition indicated by the second information for the vehicle when the user permitted the predetermined device to execute the predetermined function in the past.

In the information processing device according to the above aspect, the information on the traveling condition of the vehicle may include information on a category of a road where the vehicle is traveling.

In the information processing device according to the above aspect, the information on the traveling condition of the vehicle may include information on an execution status of a function by a device other than the predetermined device.

In the information processing device according to the above aspect, the predetermined device may be a device installed in a facility related to the user.

An information processing method according to a second aspect of the present disclosure is an information processing method to be executed by a computer. The information processing method includes acquiring a speech of a user to instruct a predetermined device to execute a predetermined function, acquiring a level of a risk expected to occur when the predetermined device executes the predetermined function, outputting a notification confirming with the user whether to permit the predetermined device to execute the predetermined function when the level of the risk is equal to or higher than a predetermined level, and causing the predetermined device to execute the predetermined function when the user permits the predetermined device to execute the predetermined function.

In the information processing method according to the above aspect, the user may be an occupant of a vehicle, and the predetermined device may be an in-vehicle device mounted on the vehicle.

The information processing method according to the above aspect may further include acquiring first information including information on a traveling condition of the vehicle when the user makes the speech, and determining whether the level of the risk is equal to or higher than the predetermined level based on the traveling condition of the vehicle that is indicated by the first information.

The information processing method according to the above aspect may further include acquiring first information including information on a traveling condition of the vehicle when the user makes the speech, acquiring second information including information on a traveling condition of the vehicle when the user permitted the predetermined device to execute the predetermined function in a past, and causing the predetermined device to execute the predetermined function without outputting the notification in a case where the traveling condition indicated by the first information for the vehicle when the user makes the speech agrees with the traveling condition indicated by the second information for the vehicle when the user permitted the predetermined device to execute the predetermined function in the past.

In the information processing method according to the above aspect, the information on the traveling condition of the vehicle may include information on a category of a road where the vehicle is traveling.

In the information processing method according to the above aspect, the information on the traveling condition of the vehicle may include information on an execution status of a function by a device other than the predetermined device.

In the information processing method according to the above aspect, the predetermined device may be a device installed in a facility related to the user.

A non-transitory computer-readable storage medium according to a third aspect of the present disclosure stores a program causing a computer to execute an information processing method. The information processing method includes acquiring a speech of a user to instruct a predetermined device to execute a predetermined function, acquiring a level of a risk expected to occur when the predetermined device executes the predetermined function, outputting a notification confirming with the user whether to permit the predetermined device to execute the predetermined function when the level of the risk is equal to or higher than a predetermined level, and causing the predetermined device to execute the predetermined function when the user permits the predetermined device to execute the predetermined function.

In the non-transitory computer-readable storage medium according to the above aspect, the user may be an occupant of a vehicle, and the predetermined device may be an in-vehicle device mounted on the vehicle.

In the non-transitory computer-readable storage medium according to the above aspect, the information processing method may further include acquiring first information including information on a traveling condition of the vehicle when the user makes the speech, and determining whether the level of the risk is equal to or higher than the predetermined level based on the traveling condition of the vehicle that is indicated by the first information.

In the non-transitory computer-readable storage medium according to the above aspect, the information processing method may further include acquiring first information including information on a traveling condition of the vehicle when the user makes the speech, acquiring second information including information on a traveling condition of the vehicle when the user permitted the predetermined device to execute the predetermined function in a past, and causing the predetermined device to execute the predetermined function without outputting the notification in a case where the traveling condition indicated by the first information for the vehicle when the user makes the speech agrees with the traveling condition indicated by the second information for the vehicle when the user permitted the predetermined device to execute the predetermined function in the past.

In the non-transitory computer-readable storage medium according to the above aspect, the information on the traveling condition of the vehicle may include information on a category of a road where the vehicle is traveling.

In the non-transitory computer-readable storage medium according to the above aspect, the information on the traveling condition of the vehicle may include information on an execution status of a function by a device other than the predetermined device.

According to the present disclosure, the predetermined device can safely execute the predetermined function.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block diagram schematically showing an example of the functional configuration of a first device;

FIG. 3 shows an example of a table configuration of correspondence information;

FIG. 4 shows an example of a table configuration of history information;

FIG. 7 shows another example of a table configuration of correspondence information.

DETAILED DESCRIPTION OF EMBODIMENTS

A user may make a speech to instruct a predetermined device to execute a predetermined function. At this time, the execution of the predetermined function by the predetermined device may cause a risk. That is, the execution of the predetermined function by the predetermined device may cause danger. An information processing device according to a first aspect of the present disclosure can solve such a problem.

A control unit of the information processing device according to the first aspect of the present disclosure acquires a speech of a user. The speech of the user is a speech to instruct a predetermined device to execute a predetermined function. The control unit of the information processing device acquires a level of a risk that may occur when the predetermined device executes the predetermined function. The control unit determines whether the acquired risk level is equal to or higher than a predetermined level. When determination is made that the acquired risk level is equal to or higher than the predetermined level, the control unit outputs a notification confirming with the user whether to permit the predetermined device to execute the predetermined function. The control unit causes the predetermined device to execute the predetermined function when the user permits the predetermined device to execute the predetermined function.

As described above, the information processing device seeking confirmation from the user whether to permit the predetermined device to execute the predetermined function when the risk that may occur when the predetermined device executes the predetermined function is equal to or higher than the predetermined level. Therefore, the user can grasp that the risk may occur when the predetermined device executes the predetermined function. Since the predetermined device executes the predetermined function when the predetermined device is permitted to execute the predetermined function, it is possible to suppress automatic execution of the predetermined function that may cause danger. As a result, the predetermined device can safely execute the predetermined function.

Hereinafter, a specific embodiment of the present disclosure will be described with reference to the drawings. The dimensions, materials, shapes, relative arrangements, etc. of components described in the embodiment are not intended to limit the technical scope of the present disclosure to those dimensions, materials, shapes, relative arrangements, etc. unless otherwise specified.

Embodiment

System Overview

Figure 1:
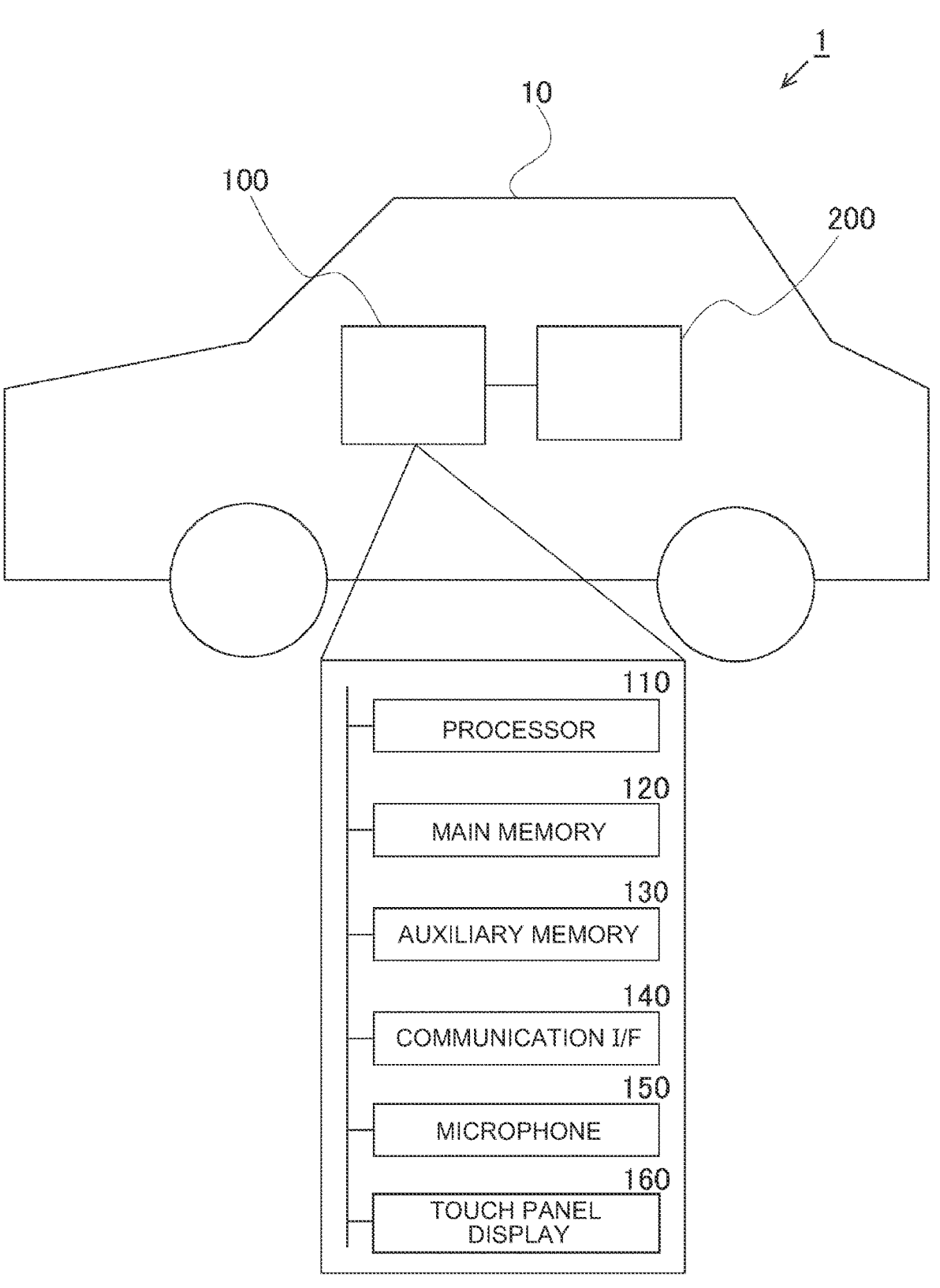
FIG. 1 shows a schematic configuration of a vehicle system.

A vehicle system 1 of the present embodiment will be described with reference to FIG. 1. FIG. 1 shows a schematic configuration of the vehicle system 1. The vehicle system 1 includes a first device 100 and a second device 200. In the vehicle system 1, the first device 100 and the second device 200 are interconnected by an in-vehicle network.

Second Device

The second device 200 is mounted on a vehicle 10. In the present embodiment, the second device 200 is an electronic control unit (ECU) that controls traveling of the vehicle 10. The second device 200 is configured to be able to execute a function of causing the vehicle 10 to travel semi-autonomously (cruise control function). The second device 200 can start the semi-autonomous traveling of the vehicle 10 by switching the traveling mode of the vehicle 10 to a cruise control mode. In this embodiment, the second device 200 is an example of "a predetermined device".

First Device

The first device 100 is mounted on the vehicle 10. In the present embodiment, the first device 100 is an example of "an information processing device". The first device 100 causes a predetermined device to execute a predetermined function based on a speech of a user of the vehicle 10. The user of the vehicle 10 (hereinafter sometimes referred to simply as "user") is an occupant of the vehicle 10. It is assumed that the user makes a speech to instruct the second device 200 to execute a function of switching the traveling mode of the vehicle 10 to the cruise control mode (hereinafter sometimes referred to as "switching function"). At this time, the traveling speed of the vehicle 10 is automatically controlled when the first device 100 causes the second device 200 to switch the traveling mode of the vehicle 10 to the cruise control mode. As a result, the vehicle 10 may be at risk.

Therefore, the first device 100 acquires the level of the risk that may occur when the predetermined device executes the predetermined function. The first device 100 outputs inquiry information (information that seeks confirmation) when the level of the risk that may occur when the predetermined device executes the predetermined function is equal to or higher than a predetermined level. The predetermined level is a level considered to pose a sufficiently high risk to the vehicle 10. The inquiry information is information for a notification confirming with the user as to whether to permit the predetermined device to execute the predetermined function.

The first device 100 displays the inquiry information to the user. Therefore, the user can grasp that the vehicle 10 may be at risk when the predetermined device executes the predetermined function. The user gives a reply to the inquiry information to the first device 100. When the user gives a reply to permit the predetermined device to execute the predetermined function, the first device 100 causes the predetermined device to execute the predetermined function.

The first device 100 includes a computer including a processor 110, a main memory 120, an auxiliary memory 130, a communication interface (communication I/F) 140, a microphone 150, and a touch panel display 160. The processor 110 is, for example, a central processing unit (CPU) or a digital signal processor (DSP). The main memory 120 is, for example, a random access memory (RAM). The auxiliary memory 130 is, for example, a read-only memory (ROM). Alternatively, the auxiliary memory 130 is, for example, a hard disk drive (HDD) or a disc recording medium such as a compact disc read-only memory (CD-ROM), a digital versatile disc (DVD), or a Blu-ray disc. The auxiliary memory 130 may be a removable medium (portable storage medium). Examples of the removable medium include a universal serial bus (USB) memory and a secure digital (SD) card. The communication I/F 140 is, for example, a local area network (LAN) interface board. The microphone 150 is provided in the vehicle 10. The touch panel display 160 is a touch panel provided in the vehicle 10.

The auxiliary memory 130 of the first device 100 stores an operating system (OS), various programs, various information tables, etc. The first device 100 can implement various functions described later by the processor 110 loading the programs stored in the auxiliary memory 130 into the main memory 120 and executing the programs. A part or all of the functions of the first device 100 may be implemented by a hardware circuit such as an application-specific integrated circuit (ASIC) or a field-programmable gate array (FPGA). The first device 100 need not be implemented by a single physical configuration, and may be configured by a plurality of computers that cooperates with each other. The second device 200 includes a computer similarly to the first device 100.

Functional Configuration

Next, the functional configuration of the first device 100 constituting the vehicle system 1 according to the present embodiment will be described with reference to FIGS. 2 to 4. FIG. 2 is a block diagram schematically showing an example of the functional configuration of the first device 100. The first device 100 includes a control unit 101, a communication unit 102, a voice acquisition unit 103, an input/output unit 104, a correspondence information database (correspondence information DB) 105, and a history information database (history information DB) 106.

The control unit 101 has a function of executing arithmetic processes for controlling the first device 100. The control unit 101 can be implemented by the processor 110 of the first device 100. The communication unit 102 has a function of connecting the first device 100 to the in-vehicle network. The communication unit 102 can be implemented by the communication I/F 140 of the first device 100.

The voice acquisition unit 103 has a function of acquiring a user's speech. The voice acquisition unit 103 can be implemented by the microphone 150 of the first device 100. The voice acquisition unit 103 transmits, to the control unit 101, voice data obtained by converting the user's speech. The control unit 101 identifies details of a user's instruction based on the acquired voice data. The control unit 101 identifies a device to which the user has given the instruction to execute a function and the function under the instruction based on the details of the user's instruction.

The correspondence information DB 105 has a function of holding correspondence information. The correspondence information is information for associating a user's instruction, a device for executing a function under the user's instruction, and the function to be executed by the device. The correspondence information DB 105 can be implemented by the auxiliary memory 130 of the first device 100. FIG. 3 shows an example of a table configuration of the correspondence information. As shown in FIG. 3, the correspondence information includes an instruction field, a device field, a function field, a road category field, and a risk level field.

Information indicating a user's instruction is stored in the instruction field. An identifier associated with the user's instruction (instruction ID) is stored in the instruction field. Information on a device associated with the instruction indicated by the instruction ID stored in the instruction field is stored in the device field. An identifier of a function to be executed by the device associated with the user's instruction (device ID) is stored in the device field. Information on the function to be executed by the device for executing the user's instruction is stored in the function field. An identifier associated with the function to be executed by the device for executing the user's instruction (function ID) is stored in the function field.

Information indicating a category of a road is stored in the road category field. An identifier indicating the category of the road such as a general road or an expressway (category ID) is input to the road category field. Information indicating a level of a risk that the function associated with the function ID stored in the function field poses to the vehicle 10 when the function is executed is stored in the risk level field. The level of the risk stored in the risk level field (hereinafter sometimes referred to simply as "risk level") is set to increase as the risk on the vehicle 10 increases. In an example, the risk level has three levels: low, medium, and high.

It is assumed that the second device 200 is caused to execute the switching function. In a case where the vehicle 10 is traveling along a general road, it is assumed that the risk level is higher than that in a case where the vehicle 10 is traveling along an expressway. Therefore, in a case where a category ID indicating the general road is stored in the road category field, a higher risk level is stored in the risk level field than in a case where a category ID indicating the expressway is stored in the road category field.

The control unit 101 refers to the correspondence information held in the correspondence information DB 105 based on identified details of a user's instruction. The control unit 101 determines an instruction ID associated with the details of the user's instruction in the correspondence information. The control unit 101 acquires a device ID and a function ID associated with the determined instruction ID. Thus, the control unit 101 can grasp a device and a function associated with the details of the user's instruction.

The control unit 101 acquires a risk level associated with the determined instruction ID. Specifically, the control unit 101 acquires a category of a road based on a current position of the vehicle 10. The control unit 101 acquires the current position of the vehicle 10 and the category of the road from, for example, a car navigation system mounted on the vehicle 10. Based on the correspondence information, the control unit 101 acquires the risk level associated with the determined device ID, the determined function ID, and the acquired road category. Thus, the control unit 101 can grasp the level of the risk that may occur in the vehicle 10 when the function indicated by the acquired function ID is executed while the vehicle 10 is traveling along the acquired category of road.

The control unit 101 determines whether the acquired risk level is equal to or higher than the predetermined level.

When the acquired risk level is lower than the predetermined level, the control unit 101 transmits command information to the device indicated by the determined device ID. The command information is information for instructing the device to execute the function. Thus, the control unit 101 can cause the device indicated by the determined device ID to execute the function indicated by the determined function ID. The control unit 101 outputs inquiry information when determination is made that the acquired risk level is equal to or higher than the predetermined level. The control unit 101 transmits the inquiry information to the input/output unit 104.

The input/output unit 104 has a function for the user to input various kinds of information to the first device 100. The input/output unit 104 has a function of displaying various kinds of information for the user. The input/output unit 104 can be implemented by the touch panel display 160 of the first device 100.

The input/output unit 104 receives the inquiry information from the control unit 101. The input/output unit 104 displays the received inquiry information for the user. The user inputs a reply to the displayed inquiry information to the input/output unit 104. That is, the user inputs, to the input/output unit 104, a reply as to whether to execute the function having the risk level equal to or higher than the predetermined level. The input/output unit 104 transmits, to the control unit 101, reply information on the reply input by the user to the inquiry information. Based on the reply information, the control unit 101 determines whether to execute the function having the risk level equal to or higher than the predetermined level. When the user gives a reply in the reply information to permit the execution of the function having the risk level equal to or higher than the predetermined level, the control unit 101 outputs command information and transmits it to the device that executes the function.

When the user permitted the predetermined device to execute the predetermined function in the past, the user may feel annoyed if the inquiry information is output again. That is, when the user permitted the predetermined device to execute the predetermined function in the past, there may be cases where the confirmation about the execution of the predetermined function need not be made again. Therefore, the control unit 101 does not output the inquiry information when the user permitted the predetermined device to execute the function having the risk level equal to or higher than the predetermined level in the past while the traveling condition of the vehicle 10 was a specific condition. The control unit 101 determines whether to output the inquiry information based on history information.

The history information DB 106 has a function of holding the history information. The history information includes a traveling condition of the vehicle 10 when the user replied to the inquiry information in the past. The history information DB 106 can be implemented by the auxiliary memory 130 of the first device 100. FIG. 4 shows an example of a table configuration of the history information.

As shown in FIG. 4, the history information includes a date/time field, a road category field, a device field, and a function field. A date and time when the control unit 101 received reply information for permitting the predetermined device to execute the predetermined function are stored in the date/time field. Information on a category of a road at a position where the vehicle 10 was traveling at the date and time stored in the date/time field is stored in the road category field. A device ID of a device permitted by the user to execute the function having the risk level equal to or higher than the predetermined level is stored in the device field. A function ID of the function executed by the device indicated by the device ID stored in the device field is stored in the function field.

The control unit 101 determines whether a traveling condition of the vehicle when the user makes a speech including an instruction for causing the predetermined device to execute the predetermined function agrees with a traveling condition of the vehicle when the user permitted the predetermined device to execute the predetermined function in the past. The control unit 101 determines whether to output the inquiry information based on whether the two traveling conditions of the vehicle 10 agree with each other.

Specifically, the control unit 101 acquires, from the history information held in the history information DB 106, information on the traveling condition of the vehicle 10 when the user permitted the predetermined device to execute the predetermined function in the past. That is, the control unit 101 acquires, from the history information, information on a category of a road where the vehicle 10 was traveling when the user permitted the predetermined device to execute the predetermined function in the past. The control unit 101 determines whether a category of a road at a current position of the vehicle 10 agrees with the category of the road where the vehicle 10 was traveling when the user permitted the predetermined device to execute the predetermined function in the past. The control unit 101 skips the output of the inquiry information when the category of the road at the current position of the vehicle 10 agrees with the category of the road where the vehicle 10 was traveling when the user permitted the predetermined device to execute the predetermined function in the past.

It is assumed that the user makes a speech to the first device 100 to instruct the second device 200 to execute the switching function. It is also assumed that the user makes a speech to give the instruction to execute the switching function when the traveling condition of the vehicle 10 is a condition that the vehicle 10 is traveling along a general road. It is also assumed that the risk level for the execution of the switching function by the second device 200 is equal to or higher than the predetermined level while the vehicle 10 is traveling along the general road. It is also assumed that the risk level for the execution of the switching function by the second device 200 is lower than the predetermined level while the vehicle is traveling along an expressway.

When the user permitted the second device 200 to execute the switching function in the past while the vehicle 10 was traveling along a general road, the user may feel annoyed if the inquiry information is output again. Therefore, the control unit 101 skips the output of the inquiry information when the user permitted the execution of the switching function in the past while the vehicle 10 was traveling along the general road. Thus, it is possible to suppress the driver's annoyance. The control unit 101 may be configured not to output the inquiry information when the user permitted the second device 200 to execute the switching function more than a predetermined number of times in the past while the vehicle was traveling along the general road.

The control unit 101 does not output the inquiry information when the user makes a speech to instruct the second device 200 to execute the switching function while the vehicle 10 is traveling along an expressway. That is, the control unit 101 transmits command information for instructing the second device 200 to execute the switching function without outputting the inquiry information.

First Process

Figure 5:
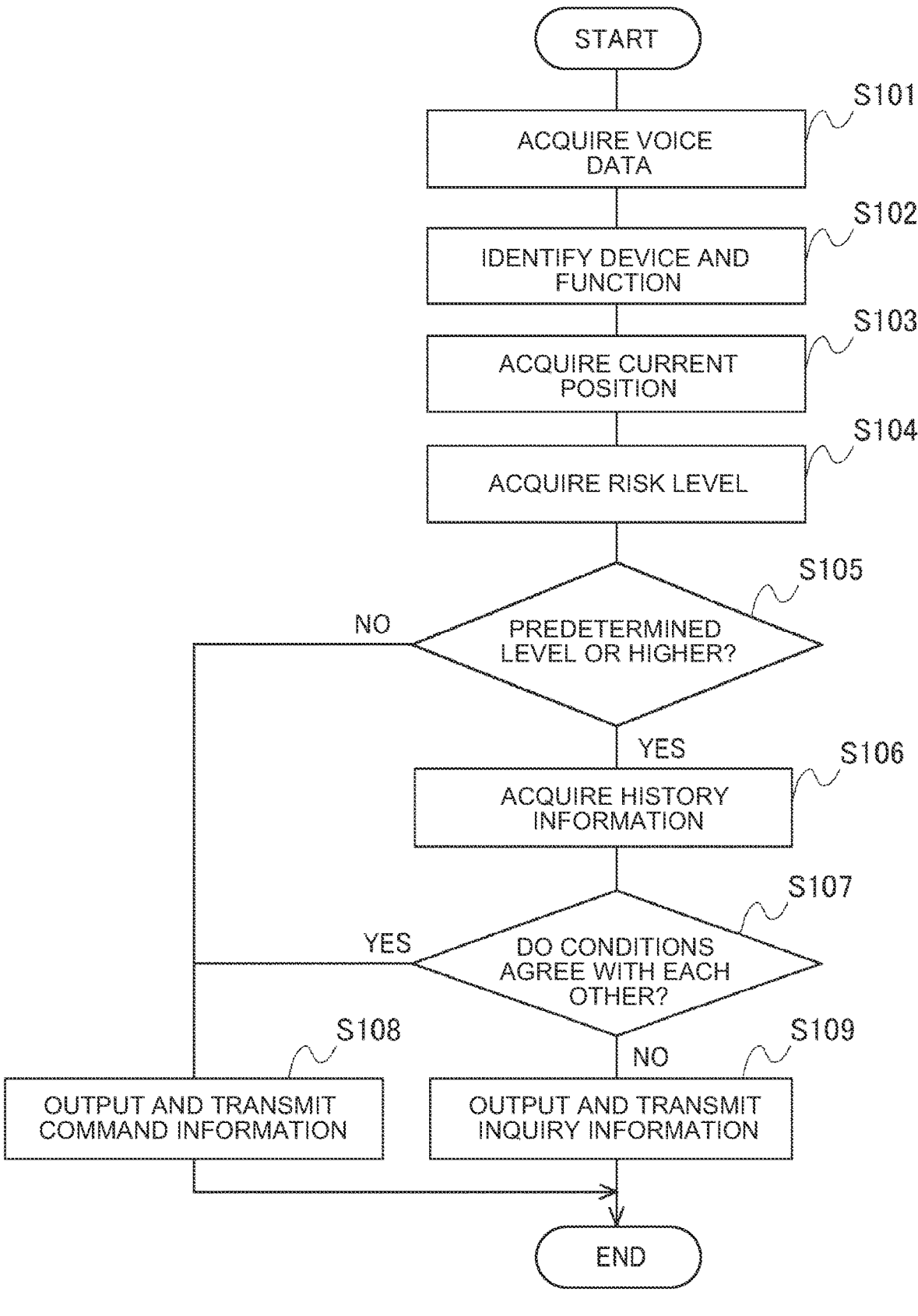
FIG. 5 is a flowchart of a first process to be executed by a control unit.

Next, a first process to be executed by the first device 100 in the vehicle system 1 will be described with reference to FIG. 5. FIG. 5 is a flowchart of the first process to be executed by the control unit 101. This process is a process for outputting the inquiry information or the command information based on a user's speech. The process is started when the user makes a speech to the first device 100 to instruct the predetermined device to execute the predetermined function.

In the first process, voice data is first acquired in S101. In S102, a device to which the user has given an instruction to execute a function and the function under the instruction are identified based on the voice data and the correspondence information held in the correspondence information DB 105. In S103, a current position of the vehicle 10 is acquired from the car navigation system of the vehicle 10. In S104, the level of a risk that may occur when the identified device executes the identified function is acquired. In S104, the risk level is acquired based on the category of a road identified based on the current position of the vehicle 10 acquired in S103.

In S105, determination is made as to whether the acquired risk level is equal to or higher than the predetermined level. When negative determination is made in S105, it can be assumed that the risk to the vehicle 10 is low even if the identified device executes the identified function. In S108, command information for executing the function identified in the process of S102 is output and transmitted to the device identified in the process of S102. Thus, the user's instruction is executed. Then, the first process is terminated.

When positive determination is made in S105, the history information held in the history information DB 106 is acquired in S106. In S107, determination is made as to whether a current traveling condition of the vehicle 10 agrees with a traveling condition of the vehicle 10 when the device identified in S102 was permitted to execute the function. When positive determination is made in S107, the current traveling condition of the vehicle agrees with the past traveling condition of the vehicle 10. Therefore, the control unit 101 need not output the inquiry information again to acquire a reply from the user. When positive determination is made in S107, in S108, the command information for executing the function identified in the process of S102 is output and transmitted to the device identified in the process of S102. Thus, the user's instruction is executed. Then, the first process is terminated.

When negative determination is made in S107, the current traveling condition of the vehicle 10 does not agree with the past traveling condition of the vehicle 10. Therefore, the inquiry information is output in S109. In S109, the inquiry information is transmitted to the input/output unit 104. Thus, the user can grasp that the vehicle 10 may have a risk at a risk level equal to or higher than the predetermined risk level when the predetermined device executes the predetermined function.

Second Process

Figure 6:
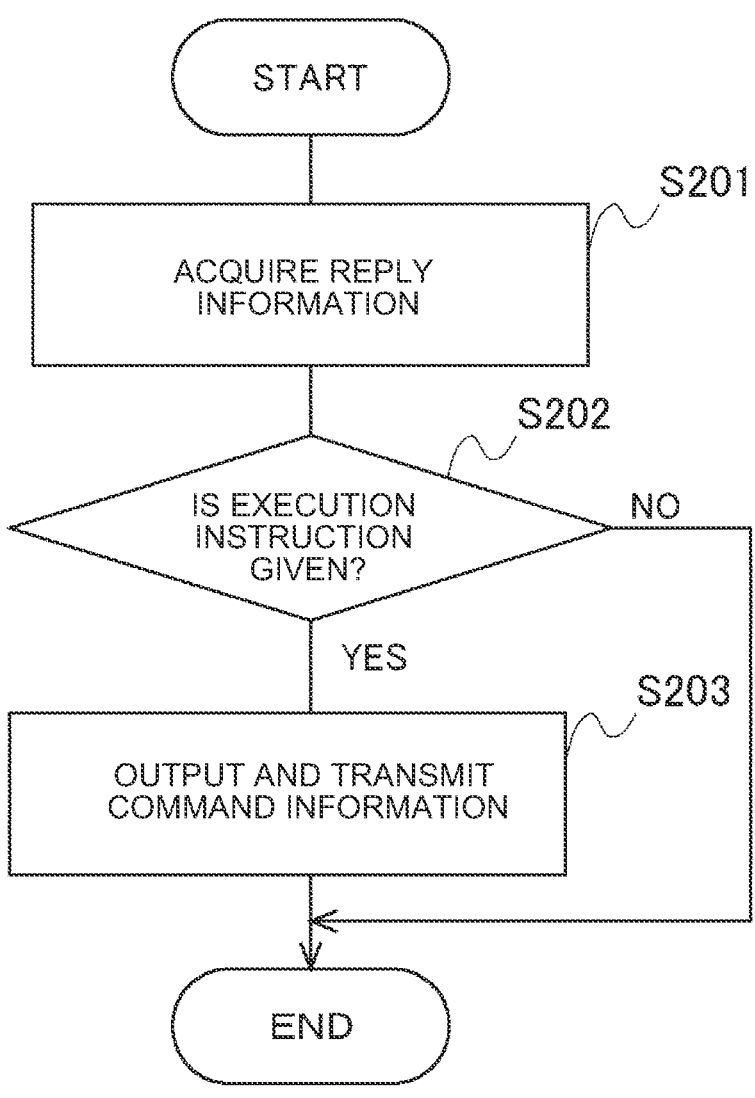
FIG. 6 is a flowchart of a second process to be executed by the control unit.

A second process to be executed by the control unit 101 of the first device 100 in the vehicle system 1 will be described with reference to FIG. 6. FIG. 6 is a flowchart of the second process to be executed by the control unit 101. This process is a process for determining whether to output the command information based on a user's reply after the transmission of the inquiry information to the input/output unit 104. The process is started when the user inputs a reply to the inquiry information to the input/output unit 104.

In the second process, reply information is acquired from the input/output unit 104 in S201 at first. In S202, determination is made as to whether the user permits, in the reply information, execution of a function having a risk level equal to or higher than the predetermined level. When negative determination is made in S202, the vehicle 10 terminates the process because the execution of the function having the risk level equal to or higher than the predetermined level is not permitted. When positive determination is made in S202, command information is output in S203 for the function having the risk level equal to or higher than the predetermined level. In S203, the command information is transmitted to the corresponding device. Then, the second process is terminated.

As described above, the vehicle system 1 confirms with the user whether to permit the predetermined device to execute the predetermined function when the risk that may occur when the predetermined device executes the predetermined function is equal to or higher than the predetermined level. Therefore, the user can grasp that the risk may occur when the predetermined device executes the predetermined function. Since the predetermined device executes the predetermined function when the predetermined device is permitted to execute the predetermined function, it is possible to suppress automatic execution of the predetermined function that may cause danger. As a result, the predetermined device can safely execute the predetermined function.

First Modification

In the present embodiment, the traveling condition of the vehicle 10 is related to the category of a road where the vehicle 10 is traveling. However, the traveling condition of the vehicle 10 is not limited to the category of a road where the vehicle 10 is traveling. The traveling condition of the vehicle 10 may be related to, for example, an execution status of a function executed by a device other than the predetermined device as shown in FIG. 7.

In this case, the first device 100 acquires an execution status of a specific function by a device other than the predetermined device mounted on the vehicle 10 (hereinafter sometimes referred to as "specific device") from the specific device. The specific device may be a device associated with the predetermined device.

The first device 100 acquires the history information held in the history information DB 106. In the present modification, the history information includes information as to whether the specific device was executing the specific function when the user permitted the predetermined device to execute the predetermined function in the past. The first device 100 determines whether an execution status of the specific function by the specific device when the user makes a speech agrees with an execution status of the specific function by the specific device when the predetermined device was permitted to execute the predetermined function. The first device 100 outputs the inquiry information when the execution status of the specific function by the specific device when the user makes the speech agrees with the execution status of the specific function by the specific device when the predetermined device was permitted to execute the predetermined function.

For example, it is assumed that the user makes a speech to give an instruction to execute a function of changing the traveling mode of the vehicle 10 to a power mode. In this case, the vehicle 10 may be traveling in an eco mode. The power mode is a mode for increasing the power of an engine or a motor of the vehicle 10. The eco mode is a mode for reducing a fuel or battery consumption of the vehicle 10. In the situation where the eco mode is executed, the fuel or battery consumption of the vehicle 10 is reduced, for example, by reducing the power of an air conditioner mounted on the vehicle 10 or the light intensity of an interior lamp.

For example, the remaining amount of the fuel or battery of the vehicle 10 may be equal to or smaller than a predetermined amount. In such a case, the traveling mode of the vehicle 10 may be changed to the eco mode. The traveling mode of the vehicle 10 may automatically be changed to the eco mode based on the remaining amount of the fuel or battery of the vehicle 10. In a situation where the vehicle 10 is traveling in the eco mode when the user makes the speech to give the instruction to execute the function of changing the traveling mode of the vehicle 10 to the power mode, the fuel or battery may run out. When executing the function of changing the traveling mode of the vehicle 10 to the power mode, the risk level may differ between the situation where the vehicle is traveling in the eco mode and the situation where the vehicle is not traveling in the eco mode. That is, when executing the function of changing the traveling mode of the vehicle 10 to the power mode, the risk level may be higher in the situation where the vehicle is traveling in the eco mode than in the situation where the vehicle is not traveling in the eco mode. Therefore, when the speech is made to change the traveling mode to the power mode, whether to output the inquiry information may be determined based on whether the current traveling mode is the eco mode. When the user permitted the execution of the function of changing the traveling mode of the vehicle 10 to the power mode in the past in the situation where the traveling mode of the vehicle 10 was the eco mode, the first device 100 may transmit the command information while skipping the output of the inquiry information.

Second Modification

In the present embodiment, the first device 100 is mounted on the vehicle 10. The first device 100 transmits the command information etc. to the device mounted on the vehicle 10. However, the first device 100 need not be mounted on the vehicle 10. The first device 100 need not even transmit the command information etc. to the device mounted on the vehicle 10. For example, the first device 100 may be installed in a facility related to the user. In this case, the first device 100 transmits the command information etc. to a device installed in the facility related to the user. Examples of the facility related to the user include a user's home and a user's workplace.

In this case, the user makes a speech to the first device 100 to give an instruction to activate a heater installed in the facility. When a function of activating the heater is executed, there is a risk of fire in the facility. Therefore, the first device 100 may determine that the risk level when the function of activating the heater is executed is equal to or higher than the predetermined level. In this case, the first device 100 outputs suggestion information for confirming the activation of the heater. Even when the first device 100 causes the device other than the device mounted on the vehicle 10 to execute the function, it is possible to ensure the safety when the user causes the predetermined device to execute the predetermined function.

OTHER EMBODIMENTS

The above embodiment is merely illustrative, and the present disclosure may be modified as appropriate without departing from the spirit and scope of the present disclosure. For example, the processes and means described in the present disclosure may be combined as desired unless technical contradiction occurs.

The process described as being executed by a single device may be executed by a plurality of devices in cooperation. Alternatively, the process described as being executed by different devices may be executed by a single device. In a computer system, the hardware configuration (server configuration) that implements functions can be changed flexibly.

The present disclosure may be embodied such that a computer program that implements the functions described in the above embodiment is supplied to a computer and is read and executed by one or more processors of the computer. The computer program may be provided to the computer by a non-transitory computer-readable storage medium connectable to a system bus of the computer, or may be provided to the computer via a network. Examples of the non-transitory computer-readable storage medium include any kind of disk or disc such as a magnetic disk (floppy (registered trademark) disk, hard disk drive (HDD), etc.) and an optical disc (CD-ROM, DVD, Blu-ray disc, etc.), and any kind of medium suitable for storing electronic instructions, such as a read-only memory (ROM), a random access memory (RAM), an erasable programmable read-only memory (EPROM), an electrically erasable programmable read-only memory (EEPROM), a magnetic card, a flash memory, and an optical card.

What is claimed is:

1. An information processing device comprising a control unit, wherein the control unit is a processor configured to:
    acquire a speech of a user to instruct a predetermined device to execute a predetermined function;
    acquire a level of a risk expected to occur when the predetermined device executes the predetermined function;
    output a notification confirming with the user whether to permit the predetermined device to execute the predetermined function when the level of the risk is equal to or higher than a predetermined level;
    cause the predetermined device to execute the predetermined function when the user permits the predetermined device to execute the predetermined function;
    acquire first information including information on a traveling condition of a vehicle when the user makes the speech;
    acquire second information including information on a traveling condition of the vehicle when the user permitted the predetermined device to execute the predetermined function in a past; and
    cause the predetermined device to execute the predetermined function without outputting the notification in a case where the traveling condition indicated by the first information for the vehicle when the user makes the speech agrees with the traveling condition indicated by the second information for the vehicle when the user permitted the predetermined device to execute the predetermined function in the past,
    wherein:
    the user is an occupant of the vehicle; and
        the predetermined device is an in-vehicle device mounted on the vehicle.

2. The information processing device according to claim 1, wherein the control unit is further configured to:

determine whether the level of the risk is equal to or higher than the predetermined level based on the traveling condition of the vehicle that is indicated by the first information.

3. The information processing device according to claim 2, wherein the information on the traveling condition of the vehicle includes information on a category of a road where the vehicle is traveling.

4. The information processing device according to claim 2, wherein the information on the traveling condition of the vehicle includes information on an execution status of a function by a device other than the predetermined device.

5. An information processing method to be executed by a computer, the information processing method comprising:
    acquiring a speech of a user to instruct a predetermined device to execute a predetermined function;
    acquiring a level of a risk expected to occur when the predetermined device executes the predetermined function;
    outputting a notification confirming with the user whether to permit the predetermined device to execute the predetermined function when the level of the risk is equal to or higher than a predetermined level; and
    causing the predetermined device to execute the predetermined function when the user permits the predetermined device to execute the predetermined function;
    wherein:
    the user is an occupant of a vehicle; and
    the predetermined device is an in-vehicle device mounted on the vehicle; and
    further comprising:
    acquiring first information including information on a traveling condition of the vehicle when the user makes the speech;
    acquiring second information including information on a traveling condition of the vehicle when the user permitted the predetermined device to execute the predetermined function in a past; and
    causing the predetermined device to execute the predetermined function without outputting the notification in a case where the traveling condition indicated by the first information for the vehicle when the user makes the speech agrees with the traveling condition indicated by the second information for the vehicle when the user permitted the predetermined device to execute the predetermined function in the past.

6. The information processing method according to claim 5, further comprising:
    determining whether the level of the risk is equal to or higher than the predetermined level based on the traveling condition of the vehicle that is indicated by the first information.

7. The information processing method according to claim 6, wherein the information on the traveling condition of the vehicle includes information on a category of a road where the vehicle is traveling.

8. The information processing method according to claim 6, wherein the information on the traveling condition of the vehicle includes information on an execution status of a function by a device other than the predetermined device.

9. A non-transitory computer-readable storage medium storing a program causing a computer to execute an information processing method, the information processing method comprising:
    acquiring a speech of a user to instruct a predetermined device to execute a predetermined function;

acquiring a level of a risk expected to occur when the predetermined device executes the predetermined function;

outputting a notification confirming with the user whether to permit the predetermined device to execute the predetermined function when the level of the risk is equal to or higher than a predetermined level; and causing the predetermined device to execute the predetermined function when the user permits the predetermined device to execute the predetermined function;

wherein:

the user is an occupant of a vehicle; and the predetermined device is an in-vehicle device mounted on the vehicle; and the information processing method further comprises:

acquiring first information including information on a traveling condition of the vehicle when the user makes the speech;

acquiring second information including information on a traveling condition of the vehicle when the user permitted the predetermined device to execute the predetermined function in a past; and causing the predetermined device to execute the predetermined function without outputting the notification in a case where the traveling condition indicated by the first information for the vehicle when the user makes the speech agrees with the traveling condition indicated by the second information for the vehicle when the user permitted the predetermined device to execute the predetermined function in the past.

10. The non-transitory computer-readable storage medium according to claim 9, wherein the information processing method further comprises:

determining whether the level of the risk is equal to or higher than the predetermined level based on the traveling condition of the vehicle that is indicated by the first information.

11. The non-transitory computer-readable storage medium according to claim 10, wherein the information on the traveling condition of the vehicle includes information on a category of a road where the vehicle is traveling.

12. The non-transitory computer-readable storage medium according to claim 10, wherein the information on the traveling condition of the vehicle includes information on an execution status of a function by a device other than the predetermined device.

* * * * *